United States Patent
Bansal et al.

(10) Patent No.: US 9,191,297 B2
(45) Date of Patent: Nov. 17, 2015

(54) PROVIDING FEEDBACK TO MEDIA SENDERS OVER REAL TIME TRANSPORT PROTOCOL (RTP)

(71) Applicant: HCL Technologies Limited, Chennai (IN)

(72) Inventors: Gaurav Bansal, Noida (IN); Anurag Jain, Noida (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 115 days.

(21) Appl. No.: 14/044,867

(22) Filed: Oct. 2, 2013

(65) Prior Publication Data
US 2014/0043994 A1    Feb. 13, 2014

(51) Int. Cl.
   G01R 31/08    (2006.01)
   H04L 12/26    (2006.01)
   H04L 12/24    (2006.01)
   H04L 29/06    (2006.01)
   H04L 12/841   (2013.01)

(52) U.S. Cl.
   CPC .......... *H04L 43/0894* (2013.01); *H04L 41/147* (2013.01); *H04L 43/0864* (2013.01); *H04L 47/283* (2013.01); *H04L 65/4084* (2013.01); *H04L 65/608* (2013.01); *H04L 65/80* (2013.01); *H04L 43/0841* (2013.01)

(58) Field of Classification Search
   None
   See application file for complete search history.

(56) References Cited

U.S. PATENT DOCUMENTS

| | | | |
|---|---|---|---|
| 6,996,624 B1 * | 2/2006 | LeCroy et al. | 709/231 |
| 2006/0146703 A1 * | 7/2006 | Cha et al. | 370/229 |
| 2006/0164982 A1 * | 7/2006 | Arora et al. | 370/229 |
| 2010/0027424 A1 * | 2/2010 | Radunovic et al. | 370/238 |
| 2010/0058147 A1 * | 3/2010 | Seferoglu et al. | 714/776 |

* cited by examiner

*Primary Examiner* — Omar Ghowrwal
*Assistant Examiner* — Angel Brockman

(57) ABSTRACT

The principal object of this embodiment is to provide regular feedback about the packet losses from a receiver to a sender in a RTP based network, based on which the sender then decides to control its transmission rate resulting in better quality of experience (QoE) for the receiver. Another object of the embodiment is to propose a method and system to send and receive feedback using lightweight protocol packets on a periodic or on as-per-required basis in a RTP based network. A further object of the embodiment is to propose a method and system to calculate and forecast Round Trip Times (RTT) at a RTP receiver in a RTP based network using double exponential smoothing methodology to calculate packet losses in that RTT.

19 Claims, 4 Drawing Sheets

PROVIDING FEEDBACK TO MEDIA SENDERS OVER REAL TIME TRANSPORT PROTOCOL (RTP)

PRIORITY DETAILS

The present application is based on, and claims priority from, Indian Application Number 1423/CHE/2013, filed on 28 Mar. 2013, the disclosure of which is hereby incorporated by reference.

TECHNICAL FIELD

This embodiment relates to Real-time Transport Protocol (RTP) based networks and more particularly to feedback mechanisms in Real-time Transport Protocol (RTP) based networks.

BACKGROUND OF EMBODIMENT

Real-time Transport Protocol (RTP) is a connectionless, stateless protocol with no reliability built in to the protocol i.e. it does not guarantee any in-order delivery of packets. It also does not support any retransmission mechanism. For historic reasons, RTP was always meant to carry traditional voice traffic over Internet Protocol (IP). For a specific application like Voice, a protocol like Transfer Control Protocol (TCP) is not the best suited transport mechanism as a delayed voice packet is better treated as lost rather than being retransmitted later. For these reasons, RTP was a much better suited protocol for carrying voice over IP. With the advent of websites like YouTube, Google Videos, News websites and other video based websites, video has become that much of an integral part of transmission. Since video actually means video and voice together, RTP was the default transport, Internet applications chose to stream video to the billions of users watching videos. Video is inherently bandwidth intensive. With compression techniques abound, the size of the contents being packed into RTP packets has certainly seen a reduction, but really there is no comparison with the original format, namely voice.

As RTP is a pure transport layer protocol, RTP does not contain enough information for carrying out OAM (Operations, Administration and Management) kind of operations viz. statistics collection, network monitoring etc. To build this capability, a control protocol, RTCP (Real-time Transport Control Protocol), was introduced which acted as a support to RTP. RTCP is a simple point to point protocol that contains various mechanisms for the two end points to exchange statistics such as jitter and packet loss to determine the current state of the network. RTCP packets have a fairly large overhead and are typically allocated only 5% of the total bandwidth. This causes inefficient monitoring of the link as these packets are sent after large time delays rather than in a short, periodic and proactive manner. These RTCP packets contain generic information and too time insensitive when we look at the type of content being carried in them, namely video.

The current RTP standard [RFC 5248] employs the RTCP (RTP Control Protocol) as the feedback mechanism. The RTCP protocol contains 2 packet type's viz. SR (sender Reports) and RR (receiver Reports) to exchange control information between the sender and the receiver, which are heavy in nature and occupy valuable bandwidth. Moreover, the RTCP packets do not contain up to date information to calculate packet event loss rate that actually mirrors the network congestion state correctly.

Transmission interval of the RTCP reports is linearly proportional to the size of the group of which multiple senders and receivers are part of. As the group size increases, the sender and receiver reports are sent less frequently. Moreover, RTCP control traffic is allocated only 5% of the total bandwidth available which causes the information contained in the sender and receiver reports to be less accurate and less in step with the current state of the network.

The current RTCP protocol only allows the calculation of a cumulative packet loss i.e. it defines packet loss as the fraction of lost packets is defined to be the number of packets lost divided by the number of packets expected based on the highest sequence number received in RTP packets. What is not reflected is this calculation as to over how many RTT times has this happened. To accurately calculate packet loss, the packet loss event rate is required.

OBJECT OF EMBODIMENT

The principal object of this embodiment is to provide regular feedback about the packet losses from a receiver to a sender in a RTP based network, based on which the sender then decides to control its transmission rate resulting in better quality of experience (QoE) for the receiver.

Another object of the embodiment is to propose a method and system to send and receive feedback using lightweight protocol packets on a periodic or on as-per-required basis in a RTP based network.

A further object of the embodiment is to propose a method and system to calculate and forecast Round Trip Times (RTT) at a RTP receiver in a RTP based network using double exponential smoothing methodology to calculate packet losses in that RTT.

STATEMENT OF EMBODIMENT

Accordingly the embodiment provides a method for enabling communication between a sender and a receiver in a Real-time Transport Protocol (RTP) based network, the method comprising of sending a feedback request RTP packet by the sender to the receiver, wherein the RTP packet comprises of an extension header; sending a response by the receiver, on the receiver receiving the feedback request RTP packet; and forecasting Round Trip Time (RTT) by the sender using double exponential smoothing, on the sender receiving the response.

Also, provided herein is a system for enabling communication between a sender and a receiver in a Real-time Transport Protocol (RTP) based network, the system configured for sending a feedback request RTP packet by the sender to the receiver, wherein the RTP packet comprises of an extension header; sending a response by the receiver, on the receiver receiving the feedback request RTP packet; and forecasting Round Trip Time (RTT) by the sender using double exponential smoothing, on the sender receiving the response.

Provided herein is a sender in a Real-time Transport Protocol (RTP) based network, the sender configured for sending a feedback request RTP packet to a receiver, wherein the RTP packet comprises of an extension header; and forecasting Round Trip Time (RTT) using double exponential smoothing, on the sender receiving a response from the receiver.

Provided herein is a receiver in a Real-time Transport Protocol (RTP) based network, the receiver configured for sending a response, on the receiver receiving a feedback request RTP packet, wherein the RTP packet comprises of an extension header.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENT

Figure 1:
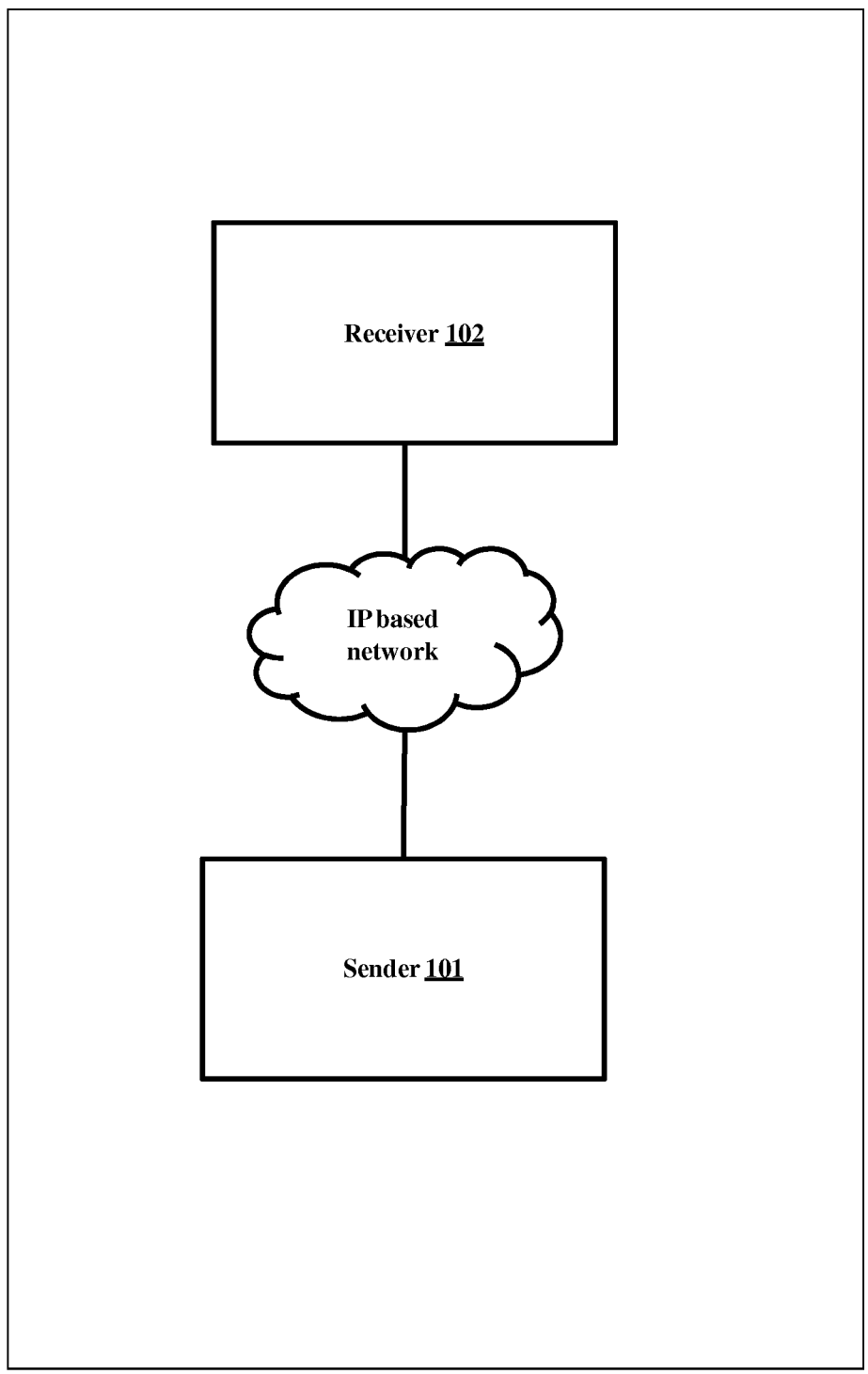
FIG. 1 depicts a network which uses Real-time Transport Protocol (RTP), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method and system to provide regular feedback about the packet losses from a receiver to a sender in a RTP based network, based on which the sender then decides to control its transmission rate resulting in better quality of experience (QoE) for the receiver. Referring now to the drawings, and more particularly to FIGS. 1 through 5, where similar reference characters denote corresponding features consistently throughout the figures, there are shown preferred embodiments.

FIG. 1 depicts a network which uses Real-time Transport Protocol (RTP), according to embodiments as disclosed herein. The network, as depicted, comprises of a sender 101 and a receiver 102 connected using an Internet Protocol (IP) based network. The sender 101 may be a device that servers data to other devices and may be at least one of a web server, a media server and so on. The receiver 102 may be any device that enables a user of the receiver 102 to access data using the IP based network. Examples of the receiver 102 are but are not limited to laptops, computers, mobile phones, tablets, PDAs (Personal Digital Assistants) and so on.

Figure 2:
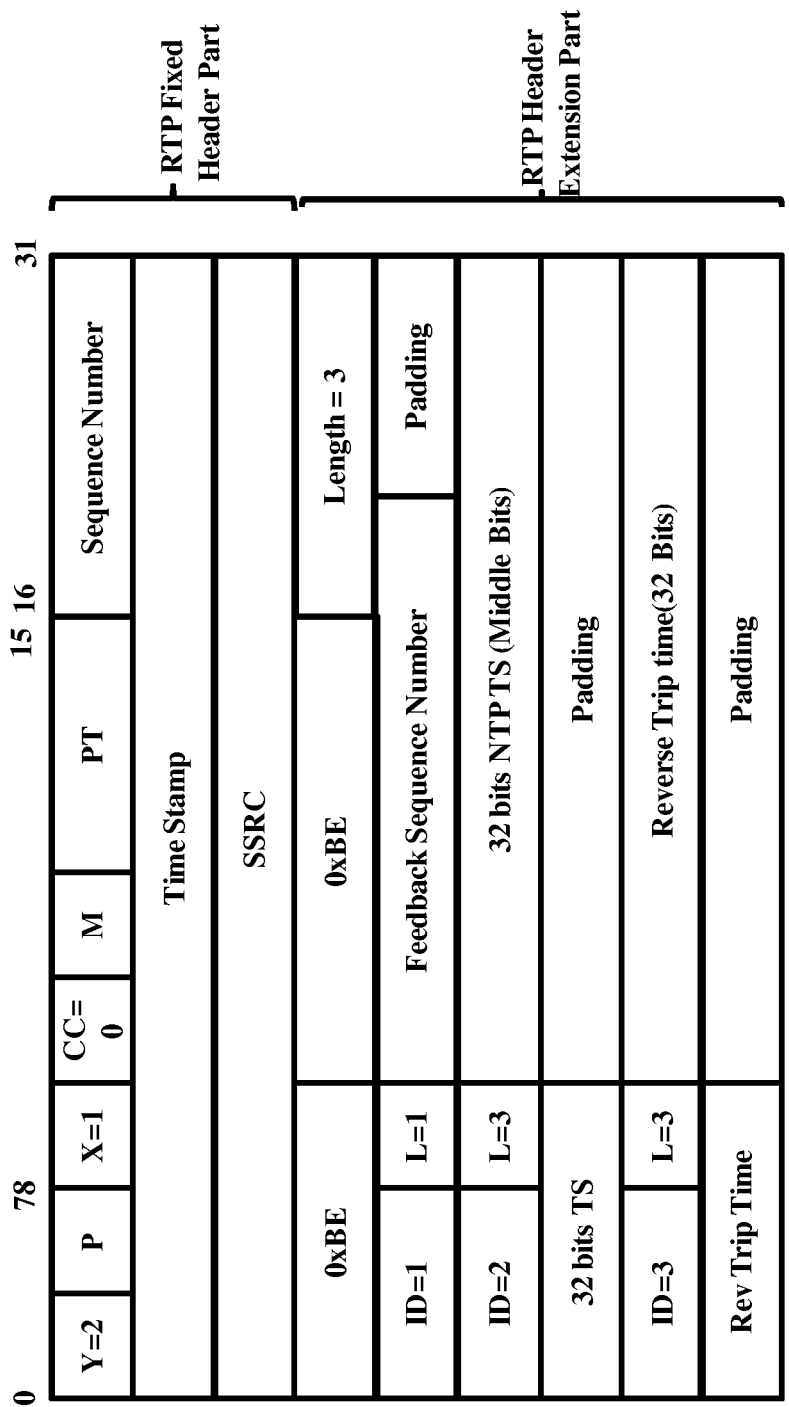
FIG. 2 depicts an exemplary format of a feedback request packet from a sender, according to embodiments as disclosed herein.

The sender 101 sends out a feedback request packet in the form of a RTP Header Extension packet once every RTT (Round Trip Time) seconds. In an embodiment herein, the feedback request packet may be part of a RTP payload packet. The format of the feedback request is as depicted in FIG. 2. For illustrative purposes, the contributing sources have been assumed to be 0. The header extension format is as per the format defined in RFC.

The $4^{th}$ bit of the fixed header when set to 1 indicates the presence of an extension header in the RTP packet (X=1). In an embodiment herein, the feedback request packet may carry 3 Header Extension tuples. The feedback request packet may get identified by the tuple #1. The tuple #1 (ID=1) in the RTP header extension indicates the sequence number that may be used for synchronization of the feedback packets between the sender 101 and the receiver 102. In an embodiment herein, all packets with ID=1 in the Header Extension fields may be dedicated to sending such feedback packets to the receiver 102. The RTP feedback request packet and a corresponding feedback sequence number may be maintained by the sender 101 on a per receiver 102 basis. In the first feedback request packet send by the sender 101, the tuple #1 has an ID value of 0. Tuple #2 (ID=2) indicates the middle 32 bits of the sender NTP timestamp (16 bits for seconds, 16 for fractional part). Tuple #3 (ID=3) indicates the reverse trip time calculated by the sender 101 on receiving a reply to the previous feedback packet from the receiver 102.

The sender 101 sends the first feedback request packet with a sequence number of 0 indicating to the receiver 101 to indicate the start of a feedback mechanism. The sender 101 sends the feedback request packet upon receiving of the feedback reply from the receiver 102. The sender 101 maintains the feedback sequence number and increments each time a feedback request packet is sent. This sequence number is sent to the receiver 102 as tuple #1. The sender 101 sends the middle 32 bits of the NTP timestamp to the receiver in the tuple #2. The timestamp is sent for the receiver to be able to calculate the forward (sender 101→receiver 102) trip time and return it back to the sender 101 in the reply feedback packet for the RTT calculation at the sender 101. The sender 101 matches the value of feedback sequence number that it sent (maintained at the sender 101) with the sequence number received in the feedback reply packet. The sender 101 then calculates the reverse trip (receiver 102→sender 101) time i.e. difference between the current time (middle 32 bits of the NTP timestamp) and the receiver side transmit timestamp sent as part of the receive feedback reply. This reverse trip time is sent to the receiver 102 in the next feedback request packet as the tuple #3.

The receiver 102 acts upon the feedback request packet once the receiver 102 receives the feedback request packet from the sender 101. On receiving the packet, the receiver 101 saves the feedback sequence number from the received feedback packet. The receiver 101 further uses the timestamp in the request packet to calculate the forward trip time by taking the difference of the timestamp and the current NTP timestamp at the receiver 102. The receiver 102 further calculates the Round Trip Time (RTT) by adding the reverse trip time present in the request packet to the forward trip time. The receiver 102 further maintains a count of the total packets lost/Round Trip Time. The RTT used to maintain the sliding window type packet loss object type would be twice the size of the received RTT value from the sender 101. In an example, if the RTT calculated is 750 ms, then the window for to calculate packet losses would be 1.5 seconds. This would mean that the receiver 102 would keep collecting packet loss information till 1.5 seconds elapse. In an embodiment herein, the receiver 102 could run a timer type object on per millisecond, per 10's of milliseconds, per 100's of milliseconds or even per second granularity. The end objective is to have the number packets lost in that 2 RTT times period. Once the 2 RTT period is over (wherein the RTT period starts when the receiver 102 received the feedback request packet from the sender 101), the receiver 102 moves the sliding window so as to have the data from the last 1.5 seconds. This allows the receiver 102 to have a kind of ready reckoner of the latest count of lost packets depending on the kind of granularity being demanded by the packet loss event algorithm running on the sender 101. The receiver 102 then can send the appropriate packet loss value back to the sender 101 depending on what the new RTT is when the receiver 102 calculates it upon receiving the next request packet. Continuing the same example, the first RTT value calculated by the receiver 102 was 750 milli-seconds; using the 2*RTT basis, it started maintaining packet loss for the last 1.5 seconds i.e. double of the RTT value received. Now say upon receiving the next feedback request packet the new RTT becomes 1 s, the receiver 102 would easily be able to provide the number of packets lost in the past 1 second since it has a much bigger packet loss buffer getting updated.

In the case of a smaller RTT immediately followed by a big network congestion scenario (a very small RTT (no network congestion) followed immediately by a large RTT (lots of network congestion)), a Double Exponential Smoothing algorithm is used to forecast RTT values. The receiver 102 then compares the algorithm inferred value with the calculated RTT and uses the larger of the two values to collect packet loss data.

The sender 101 on receiving the packet losses happening in a period corresponding to the latest Round Trip Time (RTT) from the receiver 102, the sender 101 calculates the packet loss event rate as described in [RFC 5348].

Further, the sender 101 forecasts the RTT as follows:

$$A_t = \mu X_t + (1-\mu)(A_{t-1} + B_{t-1}) \rightarrow \quad (1)$$

$$B_t = \beta(A_t - A_{t-1}) + (1-\beta)B_{t-1} \rightarrow \quad (2)$$

Estimated/Forecasted Value of $X_t = A_t + B_t$

Where,
$X_t$ is the actual value of the current period,
$\mu$ is the smoothing constant, or mu, $0 \leq \mu \leq 1$,
$\beta$ is the trend-smoothing constant or mu, $0 \leq \beta \leq 1$,
$A_t$ is the smoothed constant process value for period t,
$B_t$ is the smoothed trend value for period t,
$A_{t-1}$ is the smoothed constant process value for period t,
$B_{t-1}$ is the smoothed trend value for period t
(1) and (2) are double exponential smoothing equations.

The values of $\mu$ and $\beta$ vary between 0 and 1. The values of $\mu$ and $\beta$ are nearer to 1, if RTT being forecasted is needed to reflect recent data (less smoothing). The values of $\mu$ and $\beta$ are nearer to 0, if more smoothing is required.

Consider an example where $\mu=0.4$ and $\beta=0.7$ and the previous five RTT at any instant are 10, 11, 15, 13 and 12. The 6$^{th}$ RTT is forecasted as below:

| Historic RTT ($X_t$) | $A_t$ | $B_t$ | Forecasted $A_t + B_t$ | Deviation |
|---|---|---|---|---|
| 10 | — | — | — | — |
| 11 | 10 | 11 − 10 = 1 | 10 | — |
| 15 | (0.4 × 15) + (0.6)(10 + 1) = 12.6 | 0.7 × (12.6 − 10) + (0.3 × 1) = 2.12 | 11 | 4 |
| 13 | (0.4 × 13) + (0.6)(14.72) = 14.03 | 0.7 × (14.03 − 12.6) + (0.3 × 2.12) = 1.64 | 12.6 + 2.12 = 14.72 | 1.72 |
| 12 | (0.4 × 12) + (0.6)(15.67) = 14.20 | 0.7 × (14.2 − 14.03) + (0.3 × 1.64) = 0.61 | 14.03 + 1.64 = 15.67 | 3.67 |
| Actual RTT | | | 14.20 + 0.61 = 14.81 | |

Figure 3:
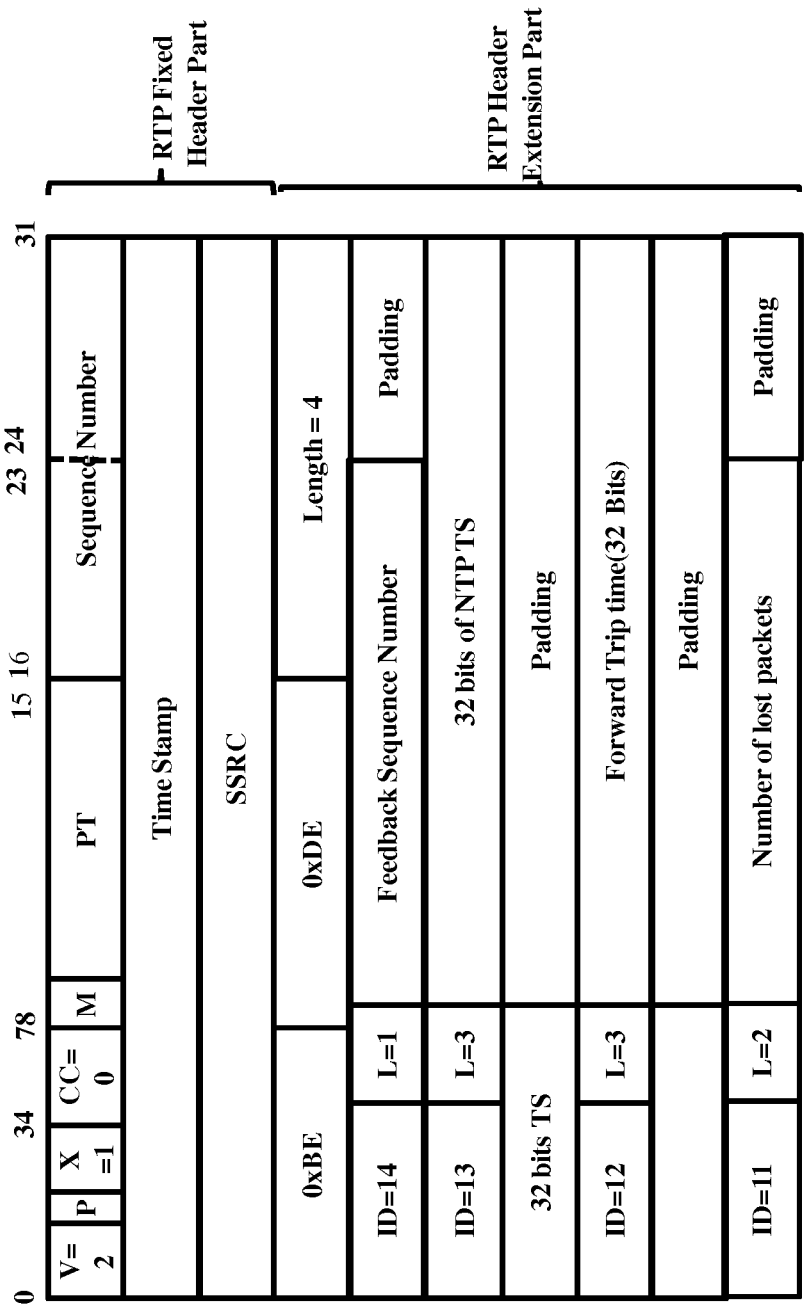
FIG. 3 depicts an exemplary format of a feedback reply packet from a receiver, according to embodiments as disclosed herein.

The receiver 102 clears the packet loss array buffer and reset upon receiving of the feedback request packet from the sender 101. The receiver 102 sends the feedback reply packet (as depicted in FIG. 3) to the sender 101. This feedback reply packet may be a RTP Header Extension packet type with four tuple's in the reply packet. The ID value in the first tuple is 14 which identify this packet as the feedback reply packet. The data field of the tuple with ID=14 carries the value received as the feedback request packet sequence number from the sender 101 to be able to synchronize the sender 101 and receiver 102 feedback sequence numbers. The second tuple with ID=13 carries the middle 32 bits of the current timestamp for the sender to be able to calculate the reverse trip time. The third tuple with ID=12 carries the forward trip time as calculated by the receiver upon receiving the sender feedback request packet. The fourth tuple with ID=11 indicates the number of packets lost in the last round trip time duration elapsed.

The receiver 102 performs the above steps on SSRC basis i.e. for each sender that it is receiving the transport stream from which can be identified on the basis of the SSRC coming in the RTP header of the feedback request packet.

Figure 4:
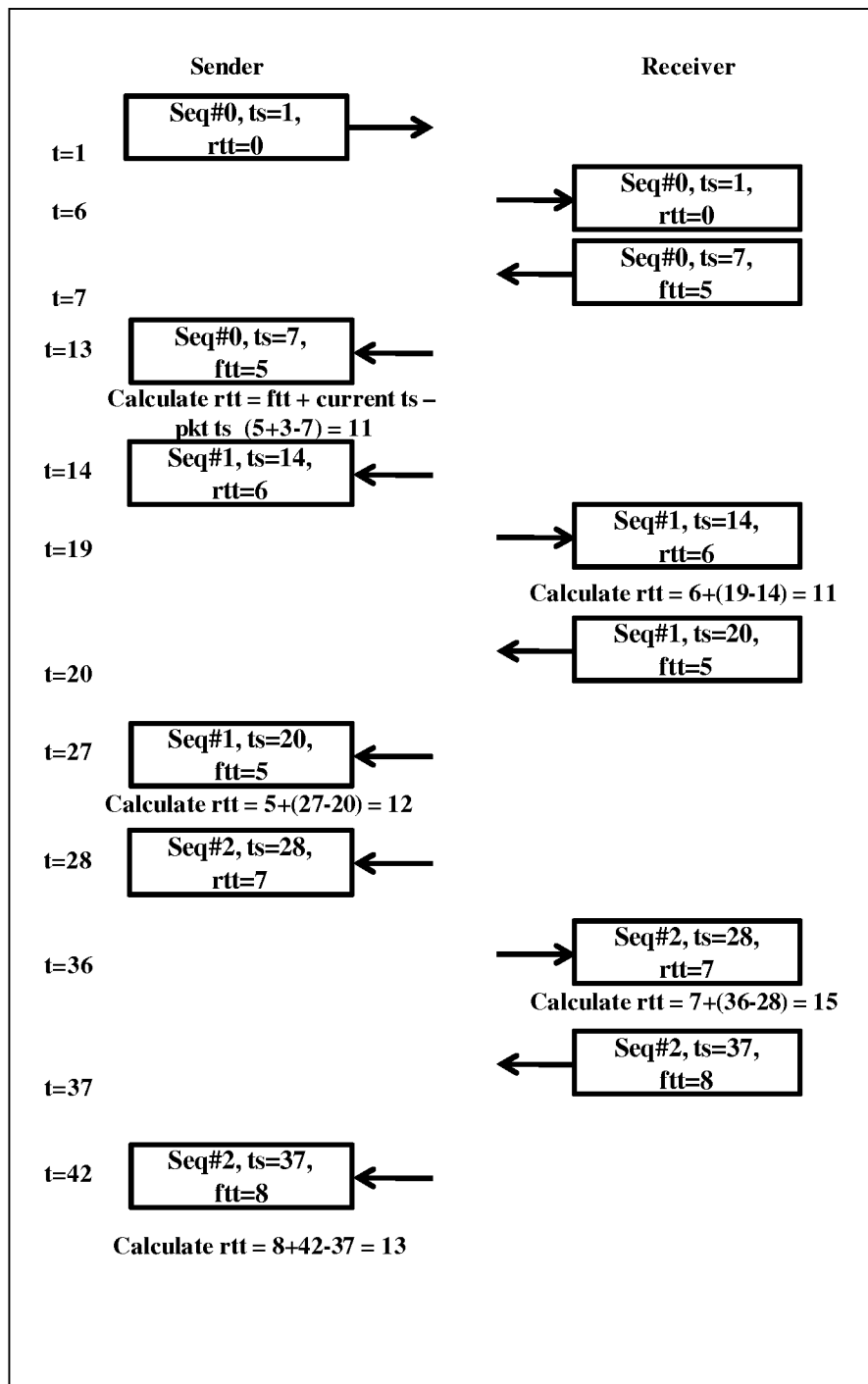
FIG. 4 depicts an exemplary feedback packet exchange flow diagram between a sender and a receiver, according to embodiments as disclosed herein.

FIG. 4 depicts an exemplary feedback packet exchange flow diagram between a sender and a receiver, according to embodiments as disclosed herein.

At t=1, the first packet with the feedback mechanism will always have Seq #0, wherein this sequence number is the feedback sequence number present in the RTP Extension Header. The sender 101 then puts the time at which the packet is transmitted, in this case ts=1, into the timestamp field and resets the RTT field to 0 to indicate the first packet of the exchange.

At t=6, the packet sent by the sender 101 at t=1 is received by the receiver 102 at t=6 as is.

At t=7, the receiver 102 having received the packet from the sender 101, processes the packet and sends back the feedback reply packet with its own transmit timestamp ie ts=7, seq #0 indicating that it's a reply to the original packet sent by the sender 101 and FTT as 5. The receiver 102 calculates the FTT as 5 by subtracting the time the receiver 102 received the packet from the timestamp present in the packet i.e. ts=1, hence 6−1=5. This way the receiver 102 indicates to the sender 101 the time taken by the forward path for a packet to reach the receiver 102.

At t=13, the packet sent by the receiver 102 is received by the sender 101 at t=13. Using the timestamp contained in the packet, which is the time at which the receiver 102 transmitted the reply, the sender 101 calculates the backward trip time by subtracting 7 from 13 making RTT=6 which the sender 101 will then use to send the next packet to the receiver 102 as shown in the packet sent at t=14.

Embodiments disclosed herein may be deployed in a network where network congestion would typically disturb the audio/video quality to the end user. Examples of such networks are but are not limited to WebRTC and Internet Video Streaming. WebRTC is a protocol mechanism to be able to launch an audio/video conference using any of the widely available web browsers bypassing the need for a specific application or plugin. In the case of WebRTC, embodiments herein will help optimize the transmission rate by getting timely feedback from the embedded WebRTC clients found in various browsers.

Embodiments disclosed herein enable calculation of the RTT more accurately due to the periodic exchange of feedback packets between the sender 101 and receiver 102. The timestamp information within the packet allows calculation of the RTT to happen at a more faster and reliable manner.

Embodiments herein make it possible to calculate the packet loss event rate. This is not possible using the existing RTCP mechanisms since the packet loss reported using the SR/RR packets is a cumulative count rather than being on a per Round Trip Time basis.

It may be possible to combine the Round Trip Time and the packet event loss rate in the equation as described in Friendly TCP [RFC 5248] to calculate the sender transmission rate based on the existing network conditions.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein describes a method and system to provide regular feedback about the packet losses from a receiver to a sender in a RTP based network, based on which the sender then decides to control its transmission rate resulting in better quality of experience (QoE) for the receiver. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiment may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for enabling communication between a sender and a receiver in a Real-Time Transport Protocol (RTP) based network, the method comprising of:
   sending a feedback request RTP packet by the sender to the receiver, wherein the RTP packet comprises of an extension header, wherein said feedback request packet is configured to be a part of an RTP payload packet;
   sending a response by the receiver, on the receiver receiving the feedback request RTP packet and broadcasting Round Trip Time (RTT) by the sender using double exponential smoothing, on the sender receiving the response and comparing a double exponential smoothing algorithm value with at least a previously calculated Round Trip Time (RTT) value.

2. The method, as claimed in claim 1, wherein the extension header comprises a time stamp.

3. The method, as claimed in claim 1, wherein the method further comprises:
   computing a Forward Trip Time (FTT) by the receiver, on the receiver receiving the feedback request RTP packet; and
   sending the FTT by the receiver with the response.

4. The method, as claimed in claim 1, wherein the receiver maintains a count of total packets lost.

5. The method, as claimed in claim 1, wherein the receiver works on Synchronization Source Identifier (SSRC) basis.

6. A method for enabling communication between a sender and a receiver in a Real-time Transport Protocol (RTP) based network, the method comprising:
   sending a feedback request RTP packet by the sender to the receiver, wherein the RTP packet comprises of an extension header;
   sending a response by the receiver, on the receiver receiving the feedback request RTP packet; and
   forecasting Round Trip Time (RTT) by the sender using double exponential smoothing, on the sender receiving the response, wherein the sender forecasts the RTT as:

$$A_t = \mu X_t + (1-\mu)(A_{t-1} + B_{t-1})$$

$$B_t = \beta(A_t - A_{t-1}) + (1-\beta)B_{t-1}$$

$$X_t = A_t + B_t$$

where
   $X_t$ is actual value of RTT in current period,
   $\mu$ is smoothing constant, or mu, $0 \leq \mu \leq 1$,
   $\beta$ is trend-smoothing constant or mu, $0 \leq \beta \leq 1$,
   $A_t$ is smoothed constant process value for period t,
   $B_t$ is smoothed trend value for period t,
   $A_{t-1}$ is smoothed constant process value for period t,
   $B_{t-1}$ is smoothed trend value for period t.

7. A system for enabling communication between a sender and a receiver in a Real-time Transport Protocol (RTP) based network, the system configured for:
  sending a feedback request RTP packet by the sender to the receiver, wherein the RTP packet comprises of" an extension header wherein said feedback request packet is configured to be a part of an RTP payload packet;
  sending a response by the receiver, on the receiver receiving the feedback request RTP packet; and
  forecasting Round Trip Time (RTT) by the sender using double exponential smoothing, on the sender receiving the response and
  comparing a double exponential smoothing algorithm value with at least a previously calculated Round Trip Time (RTT) value.

8. The system, as claimed in claim 7, wherein the extension header comprises a time stamp.

9. The system, as claimed in claim 7, wherein the receiver is further configured for:
  computing a Forward Trip Time (FTT), on the receiver receiving the feedback request RTP packet; and
  sending the FTT with the response.

10. The system, as claimed in claim 7, wherein the receiver is further configured for maintaining a count of total packets lost.

11. The system, as claimed in claim 7, wherein the receiver is further configured for working on Synchronization Source Identifier (SSRC) basis.

12. The system, as claimed in claim 7, wherein the sender is further configured for forecasting the RTT as:

$$A_t = \mu X_t + (1-\mu)(A_{t-1} + B_{t-1})$$

$$B_t = \beta(A_t - A_{t-1}) + (1\beta)B_{t-1}$$

$$X_t = A_t + B_t$$

where
$X_t$ is actual value of RTT in current period,
$\mu$ is smoothing constant, or mu, $0 \le \mu \le 1$,
$\beta$ is trend-smoothing constant or mu, $0 \le \beta \le 1$,
$A_t$ is smoothed constant process value for period t,
$B_t$ is smoothed trend value for period t,
$A_{t-1}$ is smoothed constant process value for period t,
$B_{t-1}$ is smoothed trend value for period t.

13. A system comprising a sender and a receiver in a Real-time Transport Protocol (RTP) based network, configured for: said sender sending a feedback request RTP packet to a receiver, wherein the RTP packet comprises an extension header; and
  said sender forecasting Round Trip Time (RTT) using double exponential smoothing, on the sender receiving a response from the receiver; said receiver sending a response, wherein the RTP packet comprises an extension header; said sender comparing a double exponential smoothing algorithm value with at least a previously calculated Round Trip Time (RTT) value and
  said sender deciding to control transmission rate, wherein said control results in better Quality of Experience.

14. The sender, as claimed in claim 13, wherein the extension header comprises a time stamp.

15. The sender, as claimed in claim 13, wherein the sender is further configured for forecasting the RTT as:

$$A_t = \mu X_t + (1-\mu)(A_{t-1} + B_{t-1})$$

$$B_t = \beta(A_t - A_{t-1}) + (1\beta)B_{t-1}$$

$$X_t = A_t + B_t$$

where
$X_t$ is actual value of RTT of current period,
$\mu$ is smoothing constant, or mu, $0 \le \mu \le 1$,
$\beta$ is trend-smoothing constant or mu, $0 \le \beta \le 1$,
$A_t$ is smoothed constant process value for period t,
$B_t$ is smoothed trend value for period t,
$A_{t-1}$ is smoothed constant process value for period t,
$B_{t-1}$ is smoothed trend value for period t.

16. The receiver, as claimed in claim 13, wherein the extension header comprises a time stamp.

17. The receiver, as claimed in claim 13, wherein the receiver is further configured for:
  computing a Forward Trip Time (FTT), on the receiver receiving the feedback request RTP packet; and
  sending the FTT with the response.

18. The receiver, as claimed in claim 13, wherein the receiver is further configured for maintaining a count of total packets lost.

19. The receiver, as claimed in claim 13, wherein the receiver is further configured for working on Synchronization Source Identifier (SSRC) basis.

* * * * *